Patented Aug. 29, 1950

2,520,331

UNITED STATES PATENT OFFICE 2,520,331

ANACARDIC-CHLOROANACARDIC REACTION PRODUCTS

Emil E. Novotny, Prospectville, and George K. Vogelsang, Cheltenham Township, Montgomery County, Pa., assignors to The Borden Company, New York, N. Y., a corporation of New Jersey No Drawing. Application January 30, 1947, Serial No. 725,264

4 Claims. (Cl. 260—619)

The present invention relates to anacardic-chloroanacardic reaction products.

The object of the present invention is to produce compositions that shall be endowed with the distinctive and unique attributes associated with anacardic materials, but shall possess many of the said attributes to a superior degree so that for many applications the products of this invention can advantageously be used in lieu of the usual anacardic or chloroanacardic compositions.

An object incidentally achieved is the substantial reduction in the corrosive dermatitis-producing effects characteristic of naturally occurring anacardic materials and certain of their derivatives.

In the following description and claims the term "anacardic material" is used to designate the phenolic compounds derived from the Anacardiaceae family of plants, e. g., cashew nut shell liquid, marking nut shell liquid, Japanese lac (urushiol), anacardic acid and the products that result from the decarboxylation or heat treatment of anacardic acid or nut shell liquid; the products that result from the distillation of the aforesaid phenolic compounds; the products that result by reacting the aforesaid phenolic compounds with alcohols (our Patent No. 2,251,547) or with amines (our Patent No. 2,253,088); the ethers and esters of the aforesaid phenolic compounds as well as the acylation-distillation products disclosed in our co-pending application Serial No. 391,552 now Patent Number 2,401,095. Also suitable for use are the low polymerization products of any of the aforesaid phenolic compounds. Although these materials differ from one another they have the common attribute that they are all derived from the Anacardiaceae family of plants and that they have been found to be practical equivalents for the purposes of the present invention.

The chloroanacardic material utilized in the present invention is prepared by subjecting any of the afore-defined anacardic materials to the action of a suitable chlorinating agent until the product contains at least 10% of chlorine. Such chloroanacardic materials may conveniently be prepared by the methods disclosed in our U. S. Patent No. 2,306,077 or in our co-pending application Serial No. 458,950, filed September 19, 1942, now abandoned. Of equal utility are the chloroanacardic polymers derived from the aforesaid chloroanacardic materials by appropriate heat treatment as outlined in our co-pending application Serial No. 486,432, filed May 10, 1943, now abandoned.

Both anacardic material and chloroanacardic material have found wide use in a number of important industrial applications. In some instances mixtures of anacardic material with chloroanacardic material may advantageously be utilized. We have made the important discovery that when one subjects mixtures comprising 100 parts by weight of anacardic material and 10 to 1000 parts by weight of chloroanacardic material possessing from 10 to 40% of chlorine to temperatures of between 200° F. and 500° F. for appropriate periods of time a reaction occurs between the two materials, as is indicated by an increase in the viscosity. What is even more important is that we have discovered that such anacardic-chloroanacardic reaction products are preeminently suited for a variety of purposes and can advantageously be utilized in lieu of either anacardic material, chloroanacardic material or simple physical mixtures of anacardic material with chloroanacardic material for the production of superior products.

The precise nature of the chemical reaction occurring between the anacardic material and the chloroanacardic material is not clearly understood, but the results of the reaction are very manifest in (1) an increase in the viscosity; (2) an increase in the density; (3) a decrease in the unsaturation as determined by a slight drop in iodine or bromine number; (4) an increase in the molecular weight; (5) an altered solubility; (6) a manifest difference in behavior (as well as in the ultimate end product) when these reaction products are utilized in place of straight anacardic material, straight chloroanacardic material, or simple physical mixtures of anacardic material with chloroanacardic material, heat treated anacardic material, heat treated chloroanacardic material, or simple physical mixtures comprising heat treated anacardic material with heat treated chloroanacardic material.

Via analytical methods it can be ascertained that when the anacardic-chloroanacardic reaction products of the present invention are broken down into various constituent fractions the said fractions quantitatively and qualitatively differ from those occurring in the original composition. The mechanism of reaction is largely one of polymerization and condensation and, as far as can be ascertained, a considerable portion of the reactivity concerns itself with an inter-reaction between the anacardic material and the chloroanacardic material. Analytically, the products of the present invention are complex mixtures comprising polymerization-condensation products of anacardic material, chloroanacardic material and significantly of the inter-reaction products between the anacardic material and the chloroanacardic material, together with some unreacted materials. It is believed that the unique and distinctive attributes possessed by the anacardic-chloroanacardic reaction products of the present invention reside largely in the anacardic-chloroanacardic inter-reaction products.

The products of the present invention can advantageously be utilized for many of the processes in which one ordinarily utilizes the common anacardic materials or chloroanacardic materials. Oftentimes this substitution leads to the procurement of unique and distinctive end products superior to those produced hithertofore. For some applications it is desirable to "neutralize" the products of the present invention prior to further use. In other instances it is highly desirable to fractionate the anacardic-chloroanacardic reaction products of the present invention into low and high molecular weight fractions.

In its essence the present invention consists in reacting anacardic material with chloroanacardic material. Starting with a given type of anacardic material and a given type of chloroanacardic material the nature of the end product will depend upon the following: (1) proportion of anacardic material to chloroanacardic material; (2) the chlorine content of the chloroanacardic material; (3) the temperature to which the mixture is subjected and (4) the degree of reaction that is attained as measured in terms of some physical criteria such as the viscosity, density, mean molecular weight and so forth. We have found that in order that the end product be endowed with the unique and distinctive attributes that characterize the reaction products of the present invention the chloroanacardic material must be present in the proportion of between 10 and 1000 parts by weight per 100 parts of anacardic material.

The chlorine content of the chloroanacardic material has an important bearing upon the time and temperature necessary to achieve the desired degree of reaction, as well as upon the various physical and chemical properties of the ultimate product. Chloroanacardic material to be suitable for use in the present invention should contain not less than about 10% nor more than about 40% of chlorine. In its preferred embodiment the chlorine content should range between 10 and 30% and the optimum results are seemingly procured with chlorine contents of between 15 and 30%.

In lieu of chloroanacardic material the applicants have found that the corresponding bromine products are more or less suitable for use in the present invention. However, the bromine products are much costlier and are further possessed of a comparatively poor stability, leading to the evolution of bromine or hydrobromic acid, which in turn may lead to the destruction or corrosion of the materials with which the ultimate product may come into contact. Better than the straight bromoanacardic materials are chloro-bromoanacardic materials, preferably with the chlorine atoms exceeding the bromine atoms in number. For most practical applications, however, we have found that the chloroanacardic materials are preferred to either the bromo or chlorobromoanacardic materials from the combined standpoint of cost, stability, ease of handling, etc.

For the purposes of the present invention we have found that it is necessary to utilize temperatures of not less than about 200° F. nor above about 500° F. At below 200° F. the rate of reaction is much too slow for commercial operation, whereas at temperatures of above 500° F. the reaction is much too difficult to control. Inasmuch as it is desirable to complete the reaction in the shortest possible time so as to achieve the maximum output per unit kettle, it is desirable to operate at the highest practical temperatures. Although temperatures of between 350° F. and 500° F. may be utilized we believe it advantageous to operate at or below 350° F. We have found that the preferred temperature range is between 250° F. and 350° F. We have found it advantageous to gradually heat the mixture to a temperature of about 250° F. and then, depending upon the amount of foam present, to gradually raise the temperature to about 300° or 325° F. and to hold this temperature until the desired degree of reaction has occurred.

The rate at which heat can be applied to the mixture and hence the rate at which the temperature goes up is usually limited by the permissible foaming. For the purpose of cutting down the foam so as to permit a more rapid application of heat we have found it advantageous to add anti-foaming or de-foaming materials such as the higher alcohols (as typified by aliphatic alcohols such as butyl alcohol and those of higher molecular weight such as octanol, undecanol, tetradecanol, heptadecanol, etc.).

The rate of reaction is governed by (1) the temperature; (2) the ratio of chloroanacardic material to anacardic material; (3) the nature of the chloroanacardic material, including the chlorine content. We have found that the reaction can be speeded up through the use of strongly acidic material or powerful condensing agents. Representative of such catalysts are: the stronger mineral acids; sulfonic acids; materials that are capable of liberating strongly acidic materials such as epichlorhydrin, the saturated halogenation addition products of the aldehydes of the mono hetero atomic five membered rings, salts such as ferric chloride, aluminum chloride, etc., and materials such as boron trifluoride. Many oxidizing agents also appear to speed up the reaction. Ozone is perhaps the most potent of the oxidizing agents for this purpose. The use of a catalyst is purely optional and is, indeed, in many respects of an academic nature inasmuch as we have found that in all of the preferred embodiments of the present invention the addition of a catalyst is wholly unnecessary and is oftentimes disadvantageous. Chloroanacardic material itself tends to liberate some hydrogen chloride which, being one of the strongest of mineral acids, is capable of functioning in the role of the catalyst without the addition of any outside agent. The use of catalysts is generally disadvantageous because it introduces an extraneous material into the composition and because the resultant product is then more acidic in nature than what it would otherwise be. Where a neutral end product is required added costs are involved for the neutralization of the extra catalyst. Furthermore, in order to assure a uniform distribution of the catalyst throughout the reaction mass and to prevent localized reaction it is generally necessary to dilute or dissolve the catalyst in an appropriate medium which is soluble in the reacting mass. Only when one is severely handicapped as to the maximum temperature that one can utilize or when one utilizes a chloroanacardic material possessed of a low chlorine content of in the neighborhood of 10% is the use of a catalyst desirable. In such instances we prefer to utilize a material such as phenolsulfonic acid or diethyl sulfate dissolved in several times its weight of alcohol, phenol or other solvent.

The heating should be stopped when the desired degree of reaction has occurred. The degree of reaction that has occurred is best judged by comparing one or more physical criteria of the reaction mixture with those of the original mixture prior to the heat processing. As a controlling index one may very conveniently utilize the viscosity of molecular weight. We have found that the most rapid and convenient controlling index is the viscosity because this function permits of direct "on the spot" determination by the kettle operator without recourse to the use of skilled chemists or elaborate equipment.

The following examples are illustrative rather than limitative and, while setting forth the preferred embodiments of the present invention, it should be kept in mind that many modifications and variations can be made without departing substantially from the spirit of the invention.

Example 1

Into a kettle provided with a stirrer and facilities for heating place 100 parts by weight of anacardic material and 10 parts by weight of chloroanacardic material possessing 40% of chlorine. Stir and gradually bring the temperature up to about 225° F. (at which point one may add between about 0.25 and 1.0 part by weight of an anti-foaming agents). Heat to about 350, F. and maintain this temperature until there is a noticeable increase in viscosity. Cool to about 150° F. and run out of the kettle.

Example 2

Into a kettle provided with a stirrer and facilities for heating place 100 parts by weight of acetylated distilled cashew nut shell liquid produced by first acetylating cashew nut shell liquid and then subjecting it to distillation under conditions of elevated temperatures and high vacuum after the manner disclosed in our co-pending application Serial No. 391,552 now Patent Number 2,401,095, filed May 2, 1941, and 1000 parts by weight of chlorinated heat-treated cashew nut shell liquid possessing 10% of chlorine. Warm and, when sufficiently fluid, start the stirrer and heat to about 225° F. (at which point one may add between about 0.25 and 1.0 part by weight of an anti-foaming agent). Heat to about 250° F. and hold this temperature until a noticeable increase in viscosity has occurred. Cool to about 150° F. and run out of the kettle.

Example 3

Into a kettle provided with a stirrer and facilities for heating place 100 parts by weight of anacardic material and 200 parts by weight of a chloroanacardic material possessing 30% of chlorine. Warm the mixture and, when sufficiently fluid, start the stirrer and heat to a temperature of about 200° F. Maintain this temperature until the desired increase in viscosity has occurred. At this low temperature the reaction usually requires a few days. Via the addition of acid catalysts the reaction can be substantially speeded up. The addition of strongly acidic catalysts, however, is accompanied by certain disadvantages, e. g., the acidity of the final product is substantially increased, making the neutralization, where desired, just that much more difficult. As catalysts one may employ 1.0 part by weight of para-phenolsulfonic acid dissolved in about 3 parts by weight of alcohol. The catalyst solution should be slowly and thoroughly stirred into the mixture at the very start.

Example 4

Into a kettle provided with a stirrer and facilities for heating place 100 parts by weight of anacardic material and 50 parts by weight of chloroanacardic material possessing 20% of chlorine. Warm the mixture and when sufficiently fluid, start the stirrer and heat to about 225° F. (at which point an anti-foaming agent may be added). Heat to about 300° F. and maintain this temperature until the foaming has substantially subsided and then raise the temperature another 50° F. and hold it there until the foaming has again subsided. Continue after this fashion, i. e., raising the temperature in steps of about 50° F., until a final temperature of about 500° F. is reached. Depending upon the over-all length of time consumed in the heating process, the degree of reaction achieved, when the temperature of 500° F. is attained, may be sufficient for the purposes intended. Otherwise maintain the temperature at 500° F. until the desired degree of reaction has occurred. Cool to about 150° F. and run out of the kettle.

By using a series of kettles or by using reactors in the form of pipes or troughs it is possible to carry out this reaction in a continuous manner in view of the high reaction speeds obtained at such elevated temperatures. The major drawback to the use of temperatures in excess of about 350° F. resides in the possibility of localized overheating, causing more or less charring to occur. If a scraper type of reactor be employed a limited amount of charring may be permitted to continuously occur, inasmuch as at the terminal end of the system, as the material is being eliminated, it can be subjected to a filtering or centrifuging process, wherein the charred material is continuously removed.

Example 5

We present below an example typifying the optimum and preferred embodiments of the present invention, both as to materials and procedure.

Into a reaction kettle provided with a stirrer and facilities for heating place 100 parts by weight of heat-treated cashew nut shell liquid. Add 100 parts by weight of a cloroanacardic material having a chlorine content of 24% (prepared by chlorinating cashew nut shell liquid at a temperature of about 175° F. in the presence of about 10% of tetrachlorethylene). Warm the mixture and, when sufficiently fluid, start the stirrer, and heat to about 225° F. As anti-foam add a mixture comprising 0.25 pound of pine oil, 0.25 pound of octanol and 0.25 pound of tetradecanol. (The addition of the anti-foam is optional.) Heat the mixture to about 300° F. and maintain this temperature until the desired increase in viscosity has occurred. The end viscosity is predicated upon the use to which the material is to be put. In this specific illustrative example the reaction was continued until the end viscosity was equal to about five and one half times the viscosity prior to reaction. In this instance the initial viscosity of the mixture of anacardic material and chloroanacardic material was 220 poises and after reaction the viscosity was 1210 poises. Depending upon the use to which the product is to be put the reaction may be stopped anywhere between the point when the final viscosity is about 1.25 times the original viscosity to about 250.0 times the original viscosity. Manufacturing experience has indicated that most commercial requirements are met by products whose final viscosity is from 2.0 to 20.0 times the original viscosity, in the instance where one utilizes the raw materials indicated in this example.

Anacardic-chloroanacardic material prepared as per the foregoing examples is normally acidic. It may be conveniently neutralized via any of the commonly employed methods of neutralizing such organic materials. However, upon the basis of our experience we have found the following method to be very convenient and effective.

Into a kettle provided with a stirrer and facilities for heating and cooling place 100 parts by weight of anacardic-chloroanacardic reaction product as prepared via any of the foregoing illustrative examples. Add 200 parts by weight of benzene and stir well. Dissolve about 3 parts by weight of sodium carbonate monohydrate in about 12 parts by weight of water. Slowly add the solution of sodium carbonate to the vigorously stirred mass of anacardic-chloroanacardic material dissolved in benezene. Vigorously stir for about one hour at room temperature. Gradually apply heat and bring the mixture to a gentle boil. Distill slowly, with or without the use of a fractionating column. The distillate, upon cooling, condenses to form a condensate which stratifies into two layers, the lighter layer consisting of benzene and the heavier layer consisting of water. The benzene layer should be continuously returned to the kettle. The distillation should be continued in this manner until all the water has been removed. At this point it is desirable to check the acidity of the mass. In general it will be found either to be neutral or slightly alkaline but, in the event that it is slightly acid, it has been found convenient to neutralize the slight remaining acidity via the use of an organic base such as monoethanolamine. Add another 150 to 250 parts by weight of benzene. Stir and cool to substantially room temperature. The solids suspended in the neutralized mixture must now be removed from the solution of anacardic-chloroanacardic reaction product in benzene. This may be accomplished via filtration or preferably via the use of a centrifuge. It has been found convenient to first centrifuge the material in an ordinary centrifuge and then either to subject it to the action of a supercentrifuge or to pass it through an appropriate filter for the purpose of removing the traces of the material that the centrifuge may not have eliminated. The clarified mass is then placed into a clean kettle provided with a stirrer and facilities for heating. The benzene and other volatiles are then distilled off, preferably ending up with a temperature of between 250° and 300° F. and a vacuum of from 15 to 25 inches. The neutralized concentrate, which comprises substantially neutral anacardic-chloroanacardic material is then advantageously cooled to about 120° to 140° F. and drawn out of the kettle (or left in the kettle for further processing or reaction with other materials).

The chemical and physical properties possessed by the anacardic-chloroanacardic reaction products of the present invention cannot be specifically characterized for the reason that these properties are in no small measure predicated upon the properties of the raw materials utilized and, secondly, they are predicated upon the degree of reaction that has been achieved. The degree of reaction that is obtained is, in turn, predicated upon the application to which the material is to be put. In the light of these facts it becomes clear that it is not possible to finitely define the products of the present invention in terms of their physical and chemical constants.

For purposes of illustration we present below physical and chemical criteria possessed by the product of Example 5 which represents one of the preferred embodiments of the present invention. For purposes of comparison we also list the corresponding constants for the raw materials utilized as well as for the mixture prior to reaction.

| Material | Solids Content [1] | Specific Viscosity, 77° F., Poises | Specific Gravity, 77° F. | Chlorine Content, Percent | Iodine Number | Molecular Weight (cryoscopic in benzene) |
|---|---|---|---|---|---|---|
| Heat-treated Cashew Nut Shell Liquid | 98.3 | 2.0 | 0.967 | 0.0 | 254 | 436 |
| Chloroanacardic Material (24% chlorine) | 93.4 | 33,000.0 | 1.14 | 26.0 | 61 | 845 |
| Blend of heat-treated cashew nut shell liquid and chloroanacardic material (24% chlorine), equal parts by weight | 95.7 | 220.0 | 1.062 | 12.7 | 157 | 640 |
| Above blend—after processing | 98.0 | 1,210.0 | 1.070 | 12.6 | 144 | 840 |

[1] Heated in an oven for 1 hour at 220° F. followed by 2 hours at 320° F.

The above tabulated data is typical of the results produced when carrying out the process of the present invention as per illustrative Example 5. It is clearly seen that as a result of the processing there is a significant increase in the viscosity, specific gravity and molecular weight and a slight decrease in the iodine number. The change in viscosity is most pronounced. In this particular example the final viscosity was about five and one half times the original. By utilizing a less severe heat treatment one can readily procure any desired viscosity intermediate between the original and the one here indicated. By utilizing a more severe heat processing it is possible to procure products with greatly increased viscosity up to in excess of about 50,000 poises.

It is observed that in illustrative Example 5 the blend of anacardic and chloroanacardic material prior to processing had a viscosity of 220 poises. Had one started with a choloranacardic material with a viscosity of about 10 poises instead of one with about 33,000 poises then the viscosity of the original blend prior to processing would have been in the neighborhood of around 4 poises and if this mixture were processed so as to bring the viscosity up to 1210 poises (so as to duplicate the product of Example 5 as regards viscosity) then this would represent a 302 fold increase in viscosity as against the 5½ fold increase of the example.

The unique and distinctive products of the present invention can be utilized for a variety of purposes. In many instances they can be advantageously utilized in processes in which one ordinarily uses either the straight anacardic or chloroanacardic material. Specifically the products of the present invention have been found highly useful for the production of friction augments, impregnating and indurating agents for cellulosic products, asbestos compositions, mineral wool compositions, glass wool compositions, etc. The products of the present invention have been found outstandingly useful for the impregnation of leather. The anacardic-chloroanacardic composition of the present invention are highly useful in the compounding of natural and synthetic rubbers. These materials are also useful as plasticizing agents for a wide variety of resins and gums. They are useful for the modification of other resins such as those of the phenol-aldehyde and the ketone-aldehyde types. Via sulfonation and resinification ion exchange bases are gotten.

The products of the present invention are of value in the manufacture of adhesives; brake linings; cements; coating compositions; cold molded articles; compounding ingredients for natural and synthetic rubbers; compounding ingredients for thermoplastic resins, polyvinyl butyrals, polyvinyl alcohols, etc.; compounds for filling small transformers, terminal boxes, etc.; cable blocking agents; electrical insulation; electrical tapes; emulsions and colloidal dispersions; enamels; extenders for resins, plastics, rubbers, etc.; fillers for resins, rubbers, etc.; floor coverings; for use in connection with textiles; friction tapes; friction elements; gaskets; impregnating agents; manufacture of leather and rubber substitutes; liners; modifying agents for thermosetting resins and compounds; molding compositions; paints; paper products, e. g., proofed paper bags; plasticizers; plastics; plywood; pressure distributing pads; pressure sensitive tapes; printing plate matrices; printing plates; printing rolls; proofings to water, oils, etc.; stiffening agents; typewriter platens; varnishes; etc.

When the products of the present invention are subjected to elevated temperatures for substantial periods of time they gradually thicken and gel and finally set to rubbery, more or less infusible and insoluble masses. Via the use of catalysts and condensing agents these transformations can be greatly speeded up. Ozone and organic peroxides are potent catalysts. Concentrated sulfuric acid, Friedel-Crafts catalysts and particularly materials such as the boron trifluoride ether complex, are very helpful for the procurement of polymerization-condensation products. The products of the present invention may also be converted over into the infusible and insoluble state via the use of active aldehydes, as typified by formaldehyde, paraformaldehyde, etc. Furfural, hexamethylenetetramine and the salts of hexamethylenetetramine and, in general, bodies which liberate reactive methylene groups when subjected to heat, may be utilized for this purpose. Not infrequently it is desirable to utilize a combination of coagents, e. g., a catalyst of the peroxide type and a material such as boron trifluoride along with a reactive methylene containing body such as hexamethylenetetramine. Paraformaldehyde is one of the most potent and reactive of all condensing agents.

The products of the present invention may also be co-polymerized with polymerizable monomeric substances as typified by materials containing the vinyl or ethenoid linkage, e. g., vinyl acetate, vinyl chloride, acrylic esters, methacrylic esters, vinylidene chloride, and, in general, the unsaturated polymerizable esters, styrene, chlorostyrene, methyl styrene, acrylonitrile, etc., butadiene, isoprene, chloroprene, etc.

The products of the present invention may also be utilized in conjunction with suitable resins of the phenol-aldehyde type, urea-aldehyde type, as well as with melamine and alkyd resins. Many of the products of the present invention possess a reasonably good compatibility with coumarone-indene resins as well as polyterpene hydrocarbon resins. The products of the present invention may be directly utilized in the manufacture of thermoplastic or thermosetting resins.

The products of the present invention may, via appropriate techniques, be decomposed into their component parts and the thus isolated components may oftentimes be advantageously utilized for the production of end results superior to those procured via the use of the material in its entirety.

The materials, proportions, conditions, arrangements, and processing methods set forth in the specification are to be regarded as setting forth the preferred embodiment of the invention and as such are illustrative rather than limitative. It should be understood that many modifications and variations in the manipulative technique as well as in the matter of proportions and raw materials utilized may be made without departing from the spirit and scope of the invention defined in the appended claims.

We claim:

1. The method of producing anacardic-chloroanacardic reaction products which consists in subjecting mixtures comprising 100 parts by weight of anacardic material and 10 to 1000 parts by weight of chloroanacardic material possessing from 10 to 40% of chlorine, to temperatures of between 200° F. and 500° F. until there is a noticeable increase in viscosity.

2. The method of producing anacardic-chloroanacardic reaction products which consists in subjecting mixtures comprising 100 parts by weight of anacardic material and 25 to 400 parts by weight of chloroanacardic material possessing from 10 to 40% of chlorine, to temperatures of between 250° F. and 350° F. until there is a noticeable increase in viscosity.

3. The method of producing anacardic-chloroanacardic reaction products which consists in subjecting mixtures comprising 100 parts by weight of anacardic material with substantially 100 parts by weight of chloroanacardic material possessing from 15 to 30% of chlorine, to temperatures of between 250° F. and 350° F. until there is a noticeable increase in viscosity.

4. Anacardic-chloroanacardic reaction products produced by the process which consists in subjecting mixtures comprising 100 parts by weight of anacardic material and 10 to 1000 parts by weight of chloroanacardic material possessing from 10 to 40% of chlorine, to temperatures of between 200° F. and 500° F. until there is a noticeable increase in viscosity.

EMIL E. NOVOTNY.
GEORGE K. VOGELSANG.

REFERENCES CITED

The following references are of record in the file of this patent:

UNITED STATES PATENTS

| Number | Name | Date |
|---|---|---|
| 2,306,077 | Novotny et al. | Dec. 22, 1942 |
| 2,335,603 | Novotny et al. | Nov. 30, 1943 |
| 2,399,735 | Harvey | May 7, 1946 |
| 2,411,160 | Hughes | Nov. 19, 1946 |